United States Patent
Li et al.

(10) Patent No.: US 10,619,014 B2
(45) Date of Patent: Apr. 14, 2020

(54) MASTERBATCH FORMULATION AND FORMATION

(71) Applicant: Fina Technology, Inc., Houston, TX (US)

(72) Inventors: Fengkui Li, Houston, TX (US); Likuo Sun, Houston, TX (US)

(73) Assignee: FINA TECHNOLOGY, INC., Houston, TX (US)

(*) Notice: Subject to any disclaimer, the term of this patent is extended or adjusted under 35 U.S.C. 154(b) by 0 days.

(21) Appl. No.: 15/543,043

(22) PCT Filed: Jan. 19, 2016

(86) PCT No.: PCT/US2016/013870
§ 371 (c)(1),
(2) Date: Jul. 12, 2017

(87) PCT Pub. No.: WO2016/118486
PCT Pub. Date: Jul. 28, 2016

(65) Prior Publication Data
US 2018/0002495 A1 Jan. 4, 2018

Related U.S. Application Data

(60) Provisional application No. 62/105,094, filed on Jan. 19, 2015.

(51) Int. Cl.
| | | |
|---|---|---|
| *C08L 23/00* | (2006.01) | |
| *C08J 3/22* | (2006.01) | |
| *C08L 23/12* | (2006.01) | |
| *C08K 3/04* | (2006.01) | |
| *C08K 5/098* | (2006.01) | |

(52) U.S. Cl.
CPC ............. *C08J 3/22* (2013.01); *C08K 3/04* (2013.01); *C08K 5/098* (2013.01); *C08L 23/12* (2013.01); *C08J 2323/12* (2013.01); *C08L 2310/00* (2013.01)

(58) Field of Classification Search
CPC ... C08J 3/22; C08K 3/04; C08K 5/098; C08L 23/12
USPC ........................................................ 523/351
See application file for complete search history.

(56) References Cited

U.S. PATENT DOCUMENTS

| | | | |
|---|---|---|---|
| 5,369,168 A | 11/1994 | Famili et al. | |
| 6,100,512 A | 8/2000 | Neculescu et al. | |
| 2003/0065076 A1* | 4/2003 | Hellens | C08K 5/098 524/397 |
| 2003/0096896 A1 | 5/2003 | Wang et al. | |
| 2004/0010107 A1* | 1/2004 | Dotson | C08K 5/0083 526/351 |
| 2005/0049344 A1* | 3/2005 | Vasseur | B60C 1/0016 524/394 |
| 2006/0293458 A1* | 12/2006 | Chung | C08L 23/10 525/192 |
| 2007/0004861 A1 | 1/2007 | Cai et al. | |
| 2008/0114130 A1 | 5/2008 | Ashbaugh et al. | |
| 2008/0139718 A1* | 6/2008 | Reyntjens | C08J 3/226 524/396 |
| 2009/0215552 A1* | 8/2009 | Okamoto | A63B 37/0003 473/351 |
| 2011/0172338 A1* | 7/2011 | Murakami | C08F 214/18 524/377 |
| 2012/0156478 A1 | 6/2012 | Menalda et al. | |
| 2012/0309869 A1 | 12/2012 | Bar-Yaakov et al. | |
| 2013/0065994 A1 | 3/2013 | Yokota et al. | |
| 2015/0031838 A1* | 1/2015 | Li | C08K 5/098 525/240 |
| 2016/0237239 A1* | 8/2016 | Cortes | C08J 9/00 |

OTHER PUBLICATIONS

Search Report issued in International Application No. PCT/US16/13870, dated Mar. 30, 2016, 2 pages.

* cited by examiner

*Primary Examiner* — Hannah J Pak
(74) *Attorney, Agent, or Firm* — Albert Shung

(57) ABSTRACT

A masterbatch may include a syndiotactic polypropylene and one or more additives. The one or more additives may be present in the masterbatch in an amount of at least 13 weight percent based on a total weight of the masterbatch. The masterbatch may be formed by mixing the one or more additives with the syndiotactic polypropylene. The masterbatch may be mixed with a resin to form a resin mixture.

19 Claims, 2 Drawing Sheets

MASTERBATCH FORMULATION AND FORMATION

CROSS-REFERENCE TO RELATED APPLICATIONS

This application claims the benefit of PCT/US2016/013870 filed Jan. 19, 2016, which claims priority to U.S. Provisional Patent Application No. 62/105,094, filed on Jan. 19, 2015, which are incorporated herein by reference in their entireties for all purposes.

FIELD

Embodiments of the present disclosure generally relate to formation and formulations of masterbatches and uses thereof.

BACKGROUND

The term "masterbatch" refers to a composition obtained by a process of first mixing (e.g., melt mixing) an additive with a small amount of a carrier resin, such as a polyolefin resin, resulting in a "masterbatch." The masterbatch is then mixed with a remaining bulk of the carrier resin, or with a bulk of another resin. In certain situations, the use of a masterbatch may result in better mixing of the additive in the final mixture than were the additive to be mixed directly in the bulk of the resin.

When a masterbatch is used to improve product performance or appearance of a polymer, particularly a polyolefin resin, it may be desirable that the carrier resin used in the masterbatch also be a polyolefin resin. However, often, the concentration of additives that can be effectively dispersed in a polyolefin carrier resin is low. For instance, a typical nucleator can only be loaded up to 4 weight percent in high density polyethylene (HDPE) and up to 10 weight percent in low density polyethylene (LDPE). These additive loading levels may be too low to have practical use in an industrial setting. To reach a higher concentration of additive in masterbatches, rubber and dispersants have traditionally been used to mix with additives in heated roll mills or kneaders. Such a process is labor intensive and more costly than the extrusion and pelletizing technique. Moreover, the resulting masterbatch often imparts undesirable substances, such as rubber and dispersants, to the polyolefin matrix.

SUMMARY

An embodiment of the present disclosure includes a masterbatch. The masterbatch includes syndiotactic polypropylene and one or more additives. The one or more additives are present in the masterbatch in an amount of at least 13 weight percent based on a total weight of the masterbatch. The one or more additives include a metallic acrylate salt.

Another embodiment of the present disclosure includes a method. The method includes mixing one or more additives with a syndiotactic polypropylene to form a masterbatch. The one or more additives are present in the masterbatch in an amount of at least 13 weight percent based on a total weight of the masterbatch. The one or more additives include metallic acrylate salt.

BRIEF DESCRIPTION OF THE DRAWINGS

The present disclosure may be understood from the following detailed description when read with the accompanying figures.

DETAILED DESCRIPTION

Introduction and Definitions

Figure 1:
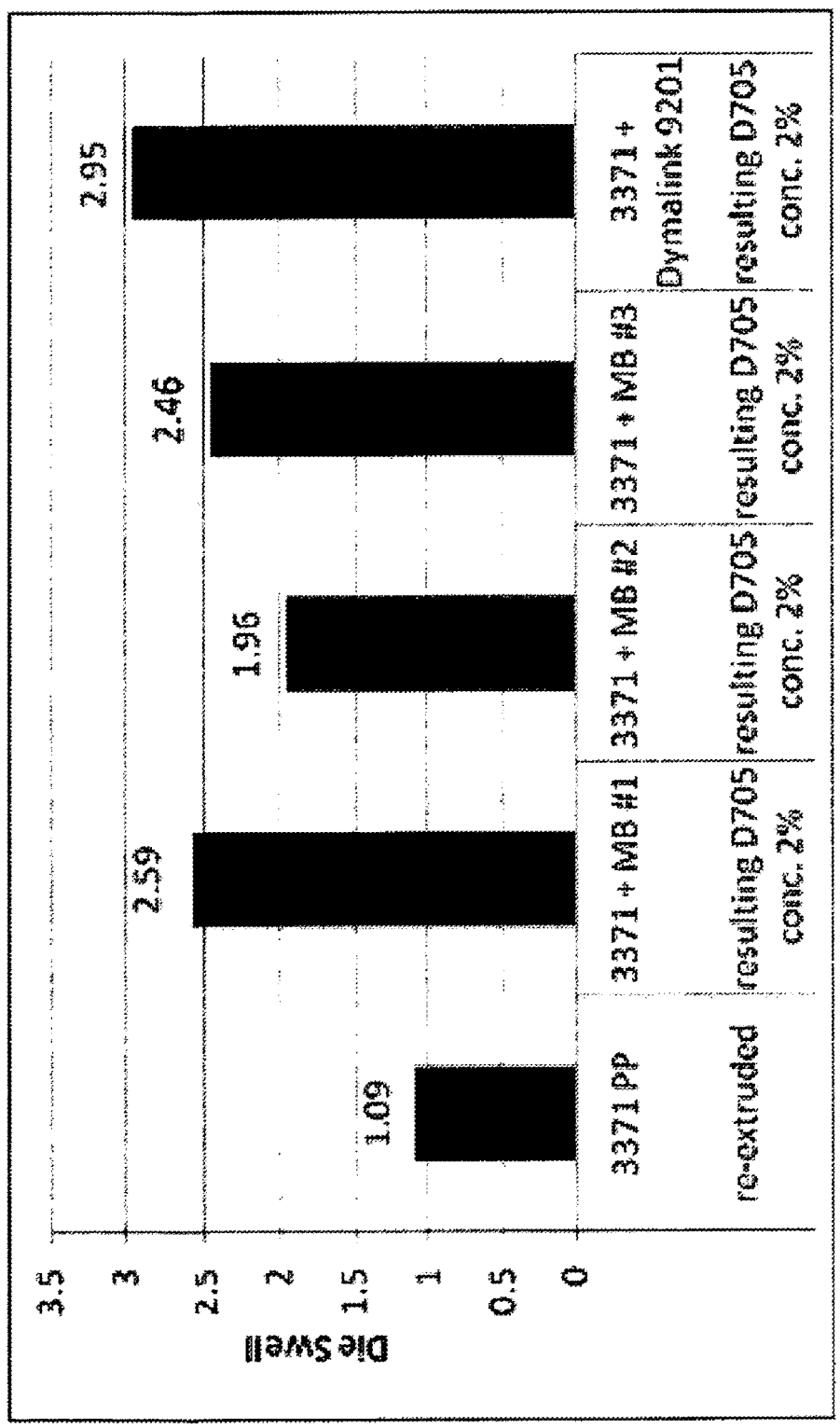
FIG. 1 is a bar graph of die swell of resin mixtures described in Example 3.

A detailed description will now be provided. The description includes specific embodiments, versions, and examples, but the disclosure is not limited to these embodiments, versions, or examples, which are included to enable a person having ordinary skill in the art to make and use the disclosure when that information is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Polymers

Polymers useful in this disclosure as a carrier resin include propylene based polymers, including syndiotactic polypropylene. A polymer is "syndiotactic" when its pendant groups alternate on opposite sides of the polymer chain. As used herein, the term "propylene based" is used interchangeably with the terms "propylene polymer" or "polypropylene," and refers to a polymer having at least about 50 weight percent, or at least about 70 weight percent, or at least about 75 weight percent, or at least about 80 weight percent, or at least about 85 weight percent, or at least about 90 weight percent, or at least about 95 weight percent polypropylene relative to a total weight of the polymer, for example. The syndiotactic polypropylene may be a homopolymer or a copolymer.

In some embodiments, the syndiotactic polypropylene may have a melt flow rate (MFR) of from 0.1 to 10 g/10 min, from 1.0 to 5 g/10 min, from 1.0 to 3 g/10 min, or about 2 g/10 min. As used herein, MFR is measured according to ASTM D 1238 standard at 230° C. under a load of 2.16 kg. In some embodiments, the syndiotactic polypropylene may have a melting point ($T_m$), as measured by Differential Scanning calorimetry (DSC), of at least about 100° C., or from about 115° C. to about 175° C., or from about 120° C. to about 140° C., or about 130° C., for example. In some embodiments, the syndiotactic polypropylene may include about 15 weight percent or less, or about 12 weight percent or less, or about 10 weight percent or less, or about 6 weight percent or less, or about 5 weight percent or less or about 4 weight percent or less of xylene soluble material (XS) as measured by ASTM D5492-06, for example. In certain embodiments, the syndiotactic polypropylene may have a molecular weight distribution ($M_w/M_n$) of from about 2 to about 50, from about 6 to about 30, or greater than or equal to 8, for example, as measured by Gas Permeation Chromatography (GPC). In some embodiments, the syndiotactic polypropylene may have a density ranging from greater than 0.850 g/cc to less than 0.900 g/cc, or from 0.87 g/cc to 0.89 g/cc, or of about 0.88 g/cc, as determined by ASTM D1505.

In some embodiments, the syndiotactic polypropylene may have a tensile modulus of from 50,000 psi to 100,000 psi, or about 70,000 psi as determined in accordance with ASTM D638; a tensile strength of from about 15,000 psi to 25,000 psi, or about 22,200 psi as determined in accordance with ASTM D638; an elongation % at yield of from 5% to 30%, from 5% to 20%, or about 11% as determined in accordance with ASTM D638; a flexural modulus of from 20,000 psi to 100,000 psi, or from 40,000 psi to 60,000 psi, or about 50,000 psi as determined in accordance with ASTM D790; a Notched Izod Impact Strength of from 0.2 ft lb/in to 20 ft lb/in, or from 5 ft lb/in to 15 ft lb/in, or about 12 ft lb/in as determined in accordance with ASTM D256A; or combinations thereof.

A non-limiting example of a syndiotactic polypropylene useful in this disclosure is TPRI 1251 manufactured by Total Petrochemicals USA, Inc. Some typical properties of TPRI 1251 are set forth in Tables 1A and 1B.

TABLE 1A

Resin Properties of TPRI 1251

| Resin Properties | Typical Value | ASTM Method |
|---|---|---|
| Melt Flow Rate, g/10 min. | 2 | D-1238 |
| Density, g/cc | 0.88 | D-1505 |
| Melt Point (° C.) | 130 | DSC |

TABLE 1B

Physical Properties of TPRI 1251

| Physical Properties | Typical Value | ASTM Method |
|---|---|---|
| Tensile Strength, psi (MPa) | 22,200 (15) | D-638 |
| Tensile Modulus, psi (MPa) | 70,000 (480) | D-638 |
| Elongation, % at Yield (% at Break) | 11 (250) | D-790 |
| Flexural Modulus, psi (MPa) | 50,000 (340) | D-638 |
| Izod Impact @ 73° F. Notched - ft.lb./in. (J/m) | 12 (640) | D-256A |
| Yellowness Index | −3.7 | D-1925 |

In certain embodiments of the present disclosure, a masterbatch may be formed from the carrier resin, such as syndiotactic polypropylene, and one or more additives. The additives may include, but are not limited to, one or more of: organometallic salts, nucleators, clarifiers, stabilizers, ultraviolet screening agents, oxidants, anti-oxidants, anti-static agents, ultraviolet light absorbents, fire retardants, processing oils, mold release agents, coloring agents (e.g., pigments and/or dyes), fillers, other additives known to one skilled in the art, and combinations thereof. In some embodiments, the one or more additives are in the form of a solid, such as a powder, when mixed with the carrier resin, such as syndiotactic polypropylene.

In some embodiments, the additive includes one or more pigments. The pigment may include blue pigment, black pigment, or combinations thereof. For example and without limitation, the pigment may include carbon black.

In some embodiments, the additive includes one or more metallic acrylate salts. Some examples of metallic acrylate salts include, but are not limited to, those represented by the formula: M (OOC)—CR$^1$═CR$^2$, R$^3$, wherein M is a metal, R$^1$ is hydrogen or methyl, and R$^2$ and R$^3$ are hydrogen. In some embodiments, M may be an alkali metal or alkaline earth metal, such as Zn, Ca, Mg, Li, Na, Pb, Sn, K, or combinations thereof. In certain embodiments, M is Zn. Examples of these metallic acrylate salts include, but are not limited to, metallic diacrylates, such as zinc diacrylate, zinc dimethylacrylate, copper diacrylate, copper dimethylacrylate, and combinations thereof. In some embodiments, the additive includes one or more organometallic salts, including, but not limited to, zinc di-vinylacetate, zinc di-ethylfumarate, copper di-vinylacetate, copper diethylefumarate, aluminum triacrylate, aluminum trimethylacrylate, aluminum tri-vinylacetate, aluminum tri-ethylfumarate, zirconium tetraacrylate, zirconium tetramethylacrylate, zirconium tetra-vinylacetate, zirconium tetra-ethyl fumarate, sodium acrylate, sodium methacrylate, silver methacrylate, and combinations thereof. Examples of metallic acrylate salts (zinc diacrylate) useful in this disclosure include DYMALINK® D705 (formerly called SR372) and DYMALINK® 9201, both made by Cray Valley In some embodiments, the additive includes one or more stabilizers. Examples of stabilizers useful herein include, but are not limited to, pentaerythritol tetrakis; tris(2,4-di-tert-butylphenyl)phosphite (sold as IRGAFOS® 168 by Ciba); bis(2,4-dicumylphenyl) pentaerythritol diphosphite (sold as DOVERPHOS® 9228 by Dover); 1,3,5-trimethyl-2,4,6-tris (3,5-di-tert-buytl-4-hydroxybenzyl)-benzene (sold as ETHANOX® 330 by Albemarle); octadecyl-3-(3,5-di-tert. butyl-4-hydroxyphenyl)-propionate (sold as IRGANOX 1076 by Ciba); synthetic hydrotalcite, such as those with the trade name DHT-4A®, available from Kyowa Chemical Industries Co.; and combinations thereof.

In some embodiments, the additive includes one or more neutralizers. Neutralizers may include, but are not limited to, metal stearates, such as zinc stearate; calcium salts derived from stearic and lactic acids, such as calcium stearoyl lactylate (sold as PATIONIC® 940 by American Ingredients Co.); calcium pelargonate; and combinations thereof.

In some embodiments, the additive includes one or more clarifiers. Examples of clarifiers include, but are not limited to, dibenzylidene sorbitols (CDBS), organophosphate salts, phosphate esters, and combinations thereof. Examples of commercially available clarifiers useful herein include, but a are not limited to, MILLAD® powdered sorbitols available from Milliken Chemical, such MILLAD® NX8000 and MILLAD® NX8000K; NA-11 and NA-21 phosphate esters available from Asahi Denka Kogyo; NC-4 from Mitsui Chemicals; HPN-68, a norbornane carboxylic-acid salt available from Milliken Chemical; and 1,3,5-Trisamide based clarifiers, such as N-[3,5-bis-(2,2-dimethyl-propionylamino)-phenyl]-2,2-dimethylpropionamide (sold as IRGACLEAR® XT386 by Ciba). Other clarifiers known to one skilled in the art can also be used. In some embodiments, clarifiers may include, but are not limited to, inorganic nucleating agents, such as pulverized clay, silicates, alkali salts, alkaline earth salts, aluminum salts, titanium salts, and metal oxides, for example; and organic nucleating agents, such as 2-mercaptobenzimidazole and 1,3,5-trisamide derivatives. An example of a nucleating agent suitable for use herein is HYPERFORM® HPN-20E made by Milliken, which consists of 2 parts cyclohexanedicarboxylic acid (1R,2S), calcium salt and 1 part zinc stearate.

In some embodiments, mixing of the one or more additives with the carrier resin, such as syndiotactic polypropylene, to form the masterbatch may be performed by melt mixing using mixing equipment including single or twin screw extruders, Banbury mixers, or roll mills, provided the additive is adequately dispersed in the polymer. In certain embodiments, the masterbatch may be extruded. In some embodiments, the masterbatch may be pelletized directly after extrusion, i.e., the masterbatch may be pelletized after extrusion without a wait time occurring between the extrusion and the pelletization. In some embodiments, the mixing of the one or more additives with the carrier resin, such as syndiotactic polypropylene, to form the masterbatch may be performed without use of heated roll mills, without use of kneaders, or without use of both heated roll mills and kneaders. In some embodiments, the mixing of the one or more additives with the carrier resin, such as syndiotactic polypropylene, to form the masterbatch may be performed only via extrusion using an extruder. In some embodiments, the masterbatch is pelletized directly after extrusion without any process steps being performed intermediate of the extrusion and pelletization steps. In some embodiments, the mixing of the one or more additives with the carrier resin, such as syndiotactic polypropylene, to form the masterbatch may be performed without use of rubbers and/or dispersants (i.e., in the absence of rubbers and/or dispersants).

In some embodiments, the one or more additives are present in an amount of at least 13 weight percent, or from 10 to 70 weight percent, or from 25 to 70 weight percent, or from 40 to 70 weight percent, or from 50 to 60 weight percent, each based on a total weight of the masterbatch.

In some embodiments, the masterbatch does not contain rubbers. In some embodiments, the masterbatch does not contain dispersants. In some embodiments, the masterbatch does not contain rubbers or dispersants.

In certain embodiments, the masterbatch has a MFR of from no flow to 0.2 g/10 min, as measured according to ASTM D 1238 standard at 230° C. under a load of 2.16 kg. In some embodiments, the masterbatch has a die swell of between 0.8 and 0.9.

Following the manufacture of the masterbatch, in certain embodiments, the masterbatch may be mixed with a polyolefin resin to obtain a resin mixture. The one or more additives may be present in the resulting resin mixture at a concentration of less than 10 weight percent, less than 5 weight percent, about 2 weight percent, or about 1 weight percent, each based on a total weight of the resin mixture. In some embodiments, the one or more additives may be present in the resulting resin mixture at a concentration of from 0.1 weight percent to 1 weight percent, or from 0.4 weight percent to 0.6 weight percent, each based on the total weight of the resin mixture. In some embodiments, the polyolefin resin mixed with the masterbatch may include, but is not limited to, polypropylene or polyethylene. In some embodiments, the polyolefin resin mixed with the masterbatch is the same polyolefin as the carrier resin. In some embodiments, the polyolefin resin mixed with the masterbatch is not the same polyolefin as the carrier resin. An example of a polyolefin resin suitable for mixing with the masterbatch herein is TPRI 3371, which is a propylene homopolymer manufactured by Total Petrochemicals USA, Inc.

Product Application

The resin mixture may be used in a variety of polymer fabrication processes known to one skilled in the art. For example, the resin mixture may be used in polymer fabrication processes including, but not limited to, foaming, sheet extrusion thermoforming, extrusion blow molding, injection stretch blow molding, blown film formation, extrusion coating, rotomolding, and profile or pipe extrusion. Films include, but are not limited to, shrink films, cling films, stretch films, sealing films, oriented films, snack packaging, heavy duty bags, grocery sacks, baked and frozen food packaging, medical packaging, industrial liners, and membranes, for example, in food-contact and non-food contact applications. Extruded articles include, but are not limited to, foamed articles used for insulation board, acoustical dampening, energy absorbing articles for automotive parts etc., and foamed food packaging containers, for example. Extruded articles also include, but are not limited to, medical tubing, wire and cable coatings, sheets, such as thermoformed sheets (including profiles and plastic corrugated cardboard), geomembranes and pond liners, for example. Molded articles include, but are not limited to, single and multi-layered constructions in the form of bottles, tanks, large hollow articles, rigid food containers and toys, for example. In some embodiments, an article formed of the resin mixture is a blown film.

EXAMPLES

The disclosure having been generally described, the following examples show particular embodiments of the disclosure. It is understood that the example is given by way of illustration and is not intended to limit the specification or the claims. All compositions percentages given in the examples are by weight.

Example 1

Two masterbatches were produced using a 27 mm twin screw extruder. A first masterbatch contained 50 weight percent of TPRI 1251, a syndiotactic polypropylene manufactured by Total Petrochemicals USA, Inc., based on a total weight of the first masterbatch. The first masterbatch also contained 50 weight percent, based on the total weight of the first masterbatch, of HYPERFORM® HPN-20E made by Milliken, which is a nucleating agent.

A second masterbatch was produced using the 27 mm twin screw extruder. The second masterbatch contained 40 weight percent of TPRI 1251 and 60 weight percent of HYPERFORM® HPN-20E, each based on the total weight of the second masterbatch.

Each of the first masterbatch and the second masterbatch were separately produced by mixing the TPRI 1251 and the HYPERFORM® HPN-20E in the 27 mm twin screw extruder, and extruding the mixture from the extruder. Directly after extrusion of the first masterbatch, the extrudate of the first masterbatch was pelletized. Also, directly after extrusion of the second masterbatch, the extrudate of the second masterbatch was pelletized. Thus, each of the first masterbatch and second masterbatch were successfully pelletized directly after extrusion.

Example 2

Three masterbatches were produced. Masterbatch #1 contained 13.1 weight percent of DYMALINK® D705 made by Cray Valley, which is a zinc diacrylate. Masterbatch #1 also contained 86.9 weight percent of TPRI 1251. Masterbatch #2 contained 24.5 weight percent of DYMALINK® D705 and 75.5 weight percent of TPRI 1251. Masterbatch #3 contained 46.3 weight percent of DYMALINK® D705 and 53.7 weight percent of TPRI 1251. Each of Masterbatch #1, #2, and #3 were produced by mixing the TPRI 1251 with the DYMALINK® D705 in a 16 mm twin screw extruder, and extruding the mixture from the extruder. The processing conditions utilized during the extrusions, including the respective extrusion temperature, main extruder rpm, hopper auger rpm, and side stuffer rpm are set forth in Table 2.

TABLE 2

Extrusion of Masterbatch of DYMALINK® D705 & TPRI 1251

| | Composition | | Process Conditions | | | |
|---|---|---|---|---|---|---|
| | DYMALINK® D705 wt. % | TPRI 1251 wt. % | Extrusion Temperature ° F. | Extruder rpm | Main Hopper Auger rpm | Side Stuffer rpm |
| Masterbatch #1 | 13.1 | 86.9 | 360 | 200 | 10 | 60 |
| Masterbatch #2 | 24.5 | 75.5 | 360 | 200 | 10 | 80 |
| Masterbatch #3 | 46.3 | 53.7 | 360 | 200 | 10 | 100 |

Directly after extrusion of Masterbatch #1, the extrudate of Masterbatch #1 was pelletized. Also, directly after extrusion of Masterbatch #2, the extrudate of Masterbatch #2 was pelletized. Directly after extrusion of Masterbatch #3, the extrudate of Masterbatch #3 was pelletized. Thus, each of Masterbatch #1, Masterbatch #2, and Masterbatch #3 were successfully pelletized directly after extursion.

The MFR and Die Swell of each of Masterbatch #1, Masterbatch #2, and Masterbatch #3 were measured, and are presented in Table 3. Also, the MFR and Die Swell of virgin pellets of TPRI 1251 (i.e., TPRI 1251 not mixed with the DYMALINK® D705 to form a masterbatch) was measured, and is presented in Table 3. As is evident from Table 3, the MFR of each of Masterbatch #1, Masterbatch #2, and Masterbatch #3 is lower than the MFR of the virgin pellets of TPRI 1251.

TABLE 3

| Sample | MFR (g/10 min) | Die Swell |
|---|---|---|
| TPRI 1251 (virgin pellets) | 2.4 | 0.85 |
| Masterbatch #1 | 0.2 | 0.88 |
| Masterbatch #2 | 0.1 | 0.81 |
| Masterbatch #3 | No flow | No flow |

Example 3

A DYMALINK® 9201 masterbatch was produced in accordance with Example 2 except that 2.8 weight percent of DYMALINK® 9201 was used in place of DYMALINK® D705. DYMALINK® 9201, made by Cray Valley, is a combination of 70 weight percent DYMALINK® D705 and 30 weight percent ethylene vinyl acetate (EVA) rubber and mineral oil.

Masterbatch #1 of Example 2 was mixed with TPRI 3371, a propylene homopolymer manufactured by Total Petrochemicals USA, Inc., to form a resin mixture that contained 2 weight percent of DYMALINK® D705. Some typical properties of TPRI 3371 are set forth in Tables 4A and 4B. Masterbatch #2 of Example 2 was mixed with TPRI 3371 to form a resin mixture that contained 2 weight percent of DYMALINK® D705. Masterbatch #3 of Example 2 was mixed with TPRI 3371 to form a resin mixture that contained 2 weight percent of DYMALINK® D705. The DYMALINK® 9201 masterbatch was mixed with TPRI 3371 to form a resin mixture that contained 2 weight percent of DYMALINK® D705.

TABLE 4A

Resin Properties of TPRI 3371

| Resin Properties | Typical Value | ASTM Method |
|---|---|---|
| Melt Flow Rate, g/10 min. | 2.8 | D-1238 |
| Density, g/cc | 0.905 | D-1505 |
| Melt Point (° C.) | 163 | DSC |

TABLE 4B

Physical Properties of TPRI 3371

| Physical Properties | Typical Value | ASTM Method |
|---|---|---|
| Haze (%) | 1.0 | D-1003 |
| Gloss, 45% | 90 | D-2457 |
| Ultimate Tensile psi MD | 19,000 | D-882 |
| Tensile Modulus psi MD | 350,000 | D-882 |
| Elongation % MD | 130 | D-882 |
| WVTR g/100 sq-in/24 hrs/mil @ 100° F., 90% RH | 0.3 | F-1249.90 |

Die swell of each of the resulting resin mixtures was measured, and is presented in FIG. 1. Die swell of virgin TPRI 3371 (i.e., TPRI 3371 not mixed with additives to form a masterbatch) was also measured, and is presented in FIG. 1. As is evident from FIG. 1, virgin TPRI 3371 exhibited the lowest measured die swell, the resin mixture containing the DYMALINK® 9201 masterbatch exhibited the highest measured die swell, and the resin mixtures containing Masterbatches #1, #2, and #3 exhibited die swells that were intermediate of the die swells of virgin TPRI 3371 and of the resin mixture containing the DYMALINK® 9201 masterbatch.

Figure 2:
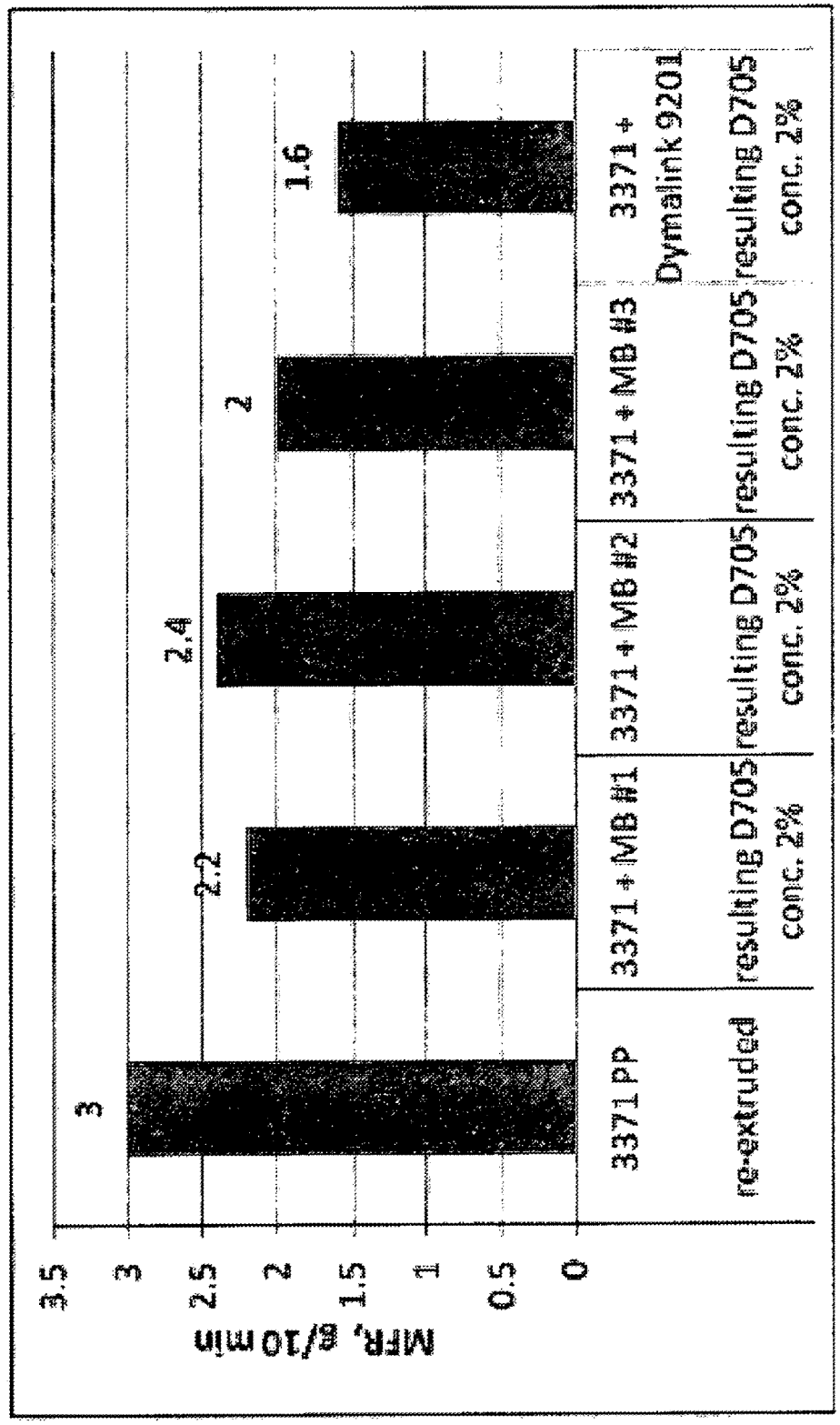
FIG. 2 is a bar graph of melt flow rates of resin mixtures described in Example 3.

MFR of each of the resulting resin mixtures was measured, and is presented in FIG. 2. MFR of virgin TPRI 3371 was also measured, and is presented in FIG. 2. As is evident from FIG. 2, the virgin TPRI 3371 exhibited the highest measured MFR, the resin mixture containing the DYMALINK® 9201 masterbatch exhibited the lowest measured MFR, and the resin mixtures containing Masterbatches #1, #2, and #3 exhibited MFRs that were intermediate of the MFRs of virgin TPRI 3371 and of the resin mixture containing the DYMALINK® 9201 masterbatch.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A masterbatch comprising:
   syndiotactic polypropylene; and
   one or more additives comprising a metallic acrylate salt, wherein the metallic acrylate salt is present in an amount of 40 to 70 weight percent based on a total weight of the masterbatch, wherein the masterbatch has a die swell of between 0.8 and 0.9.

2. The masterbatch of claim 1, wherein the one or more additives further comprises a pigment.

3. The masterbatch of claim 2, wherein the pigment comprises carbon black.

4. The masterbatch of claim 1, wherein the one or more additives further comprises a nucleator, a clarifier, a stabilizer, an ultra-violet screening agent, an oxidant, an anti-oxidant, an anti-static agent, an ultraviolet light absorbent, a fire retardant, a processing oil, a mold release agent, a coloring agent, a filler, or combinations thereof.

5. The masterbatch of claim 1, wherein the metallic acrylate salt comprises zinc diacrylate, zinc dimethylacrylate, copper diacrylate, copper dimethylacrylate, or combinations thereof.

6. The masterbatch of claim 1, wherein the one or more additives further comprise cyclohexanedicarboxylic acid, calcium salt, zinc stearate, zinc di-vinylacetate, zinc diethylfumarate, copper di-vinylacetate, copper diethylfumarate, aluminum triacrylate, aluminum trimethylacrylate, aluminum tri-vinylacetate, aluminum tri-ethylfumarate, zirconium tetraacrylate, zirconium tetramethylacrylate, zirconium tetra-vinylacetate, zirconium tetra-ethyl fumarate, or combinations thereof.

7. The masterbatch of claim 1, wherein the syndiotactic polypropylene has a melt flow rate of from 1.0 to 3.0 g/10 min, as measured in accordance with ASTM D 1238 at 230° C. under a load of 2.16 kg.

8. The masterbatch of claim 1, wherein the syndiotactic polypropylene has a melting point, as measured by DSC of from 115° C. to 175° C.

9. The masterbatch of claim 1, wherein the syndiotactic polypropylene has a density of from 0.87 to 0.89 g/cc, as measured by ASTM D 1505.

10. The masterbatch of claim 1, wherein the masterbatch has a MFR of between no flow and 0.2 g/10 min as measured by ASTM D 1238 at 230° C. under a load of 2.16 kg.

11. A method for preparing a masterbatch comprising: mixing one or more additives with a syndiotactic polypropylene to form a masterbatch, wherein the one or more additives comprise a metallic acrylate salt and the metallic acrylate salt is present in an amount of 40 to 70 weight percent based on a total weight of the masterbatch, wherein the masterbatch has a die swell of between 0.8 and 0.9.

12. The method of claim 11, wherein the one or more additives further comprise a pigment.

13. The method of claim 12, wherein the pigment comprises carbon black.

14. The method of claim 11, wherein the one or more additives further comprise an organometallic salt, a nucleator, a clarifier, a stabilizer, an ultra-violet screening agent, an oxidant, an anti-oxidant, an anti-static agent, an ultraviolet light absorbent, a fire retardant, a processing oil, a mold release agent, a coloring agent, a filler, or combinations thereof.

15. The method of claim 11, wherein the metallic acrylate salt is zinc diacrylate, zinc dimethylacrylate, copper diacrylate, copper dimethylacrylate, or combinations thereof.

16. The method of claim 11, wherein the mixing of the one or more additives with the syndiotactic polypropylene to form the masterbatch is performed by extrusion of the one or more additives with the syndiotactic polypropylene.

17. A method of forming pellets comprising directly pelletizing the masterbatch prepared by the method of claim 11 after extrusion of the one or more additives with the syndiotactic polypropylene.

18. A method of forming a resin mixture, comprising mixing the masterbatch prepared by the method of claim 11 with a resin to form a resin mixture.

19. The method of claim 18, wherein the resin is polypropylene or polyethylene.

\* \* \* \* \*